2 Sheets—Sheet 2.
R. U. ETZENSBERGER.
APPARATUS FOR MAKING INFUSIONS.
No. 190,964. Patented May 22, 1877.
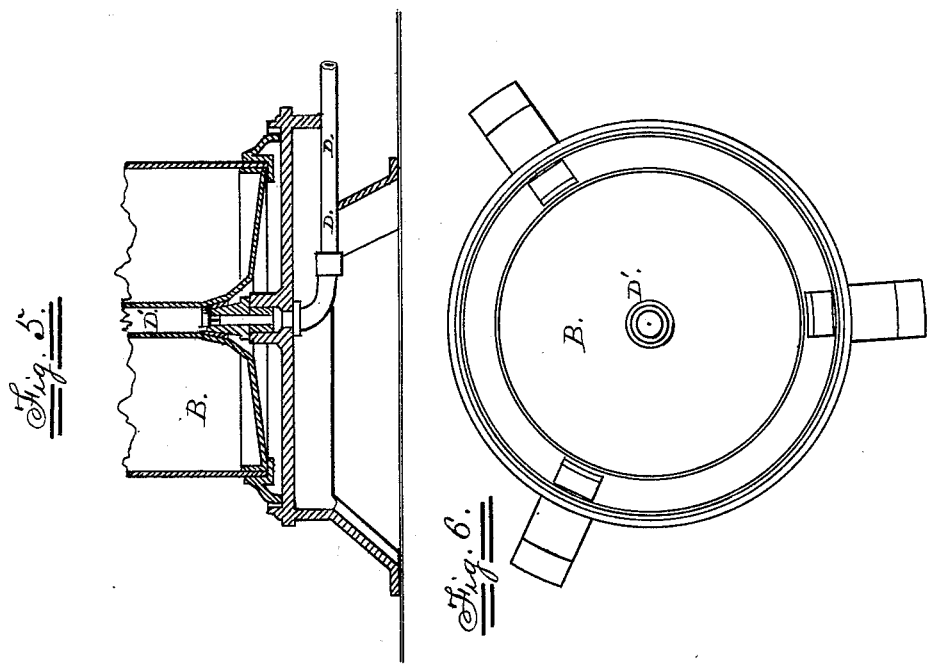
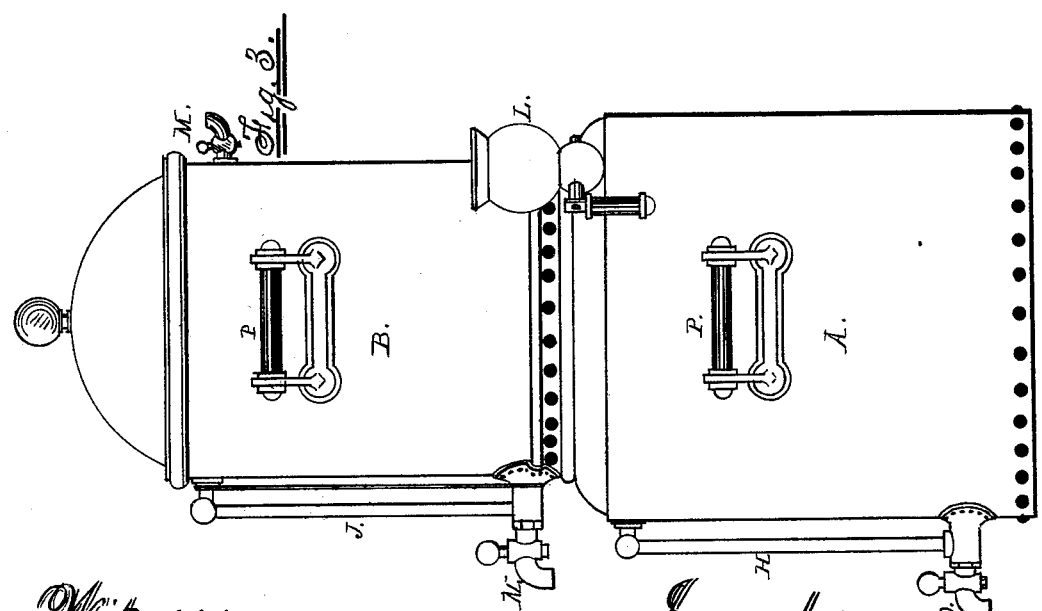

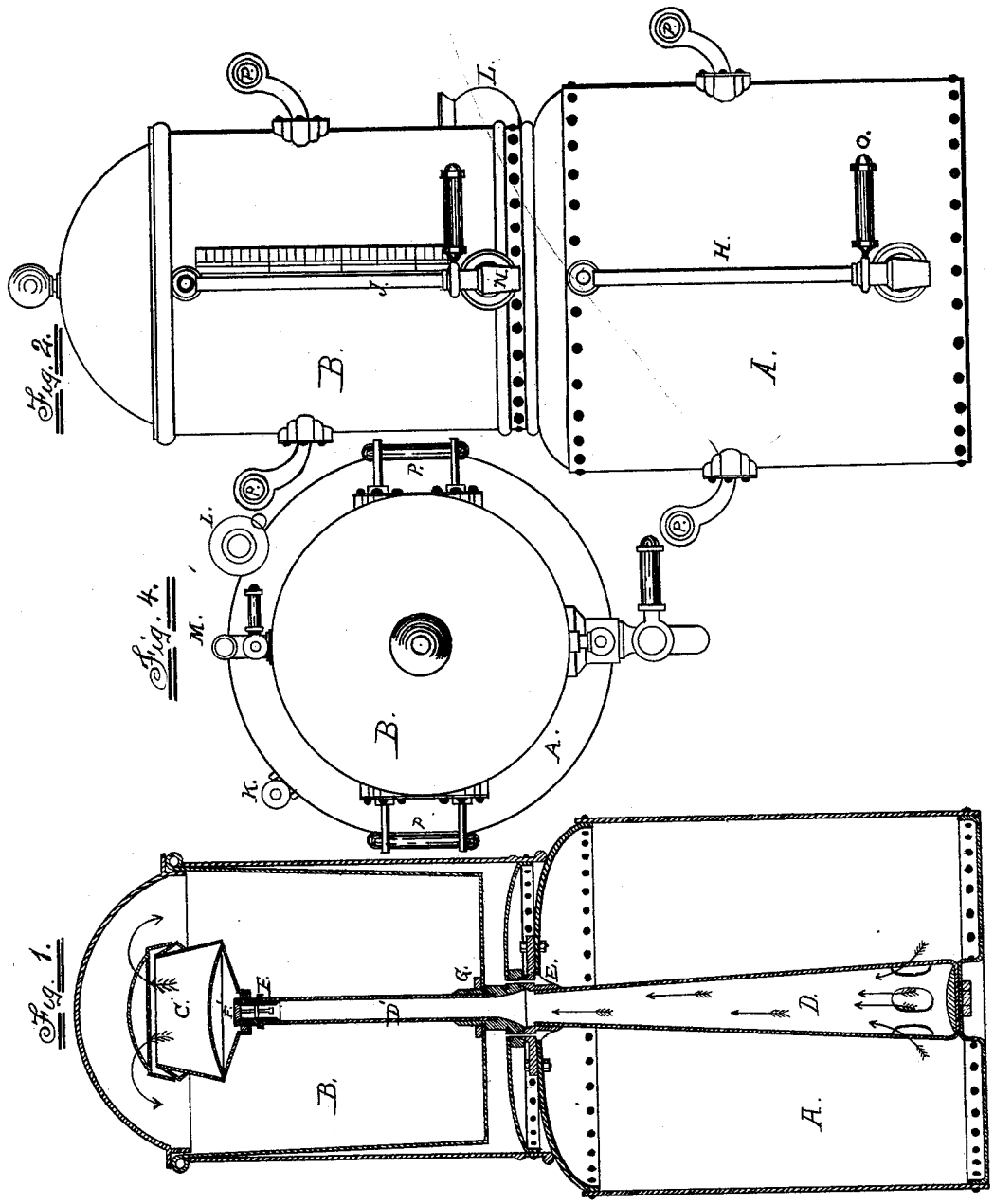

UNITED STATES PATENT OFFICE.

ROBERT U. ETZENSBERGER, OF LONDON, ENGLAND.

IMPROVEMENT IN APPARATUS FOR MAKING INFUSIONS.

Specification forming part of Letters Patent No. 190,964, dated May 22, 1877; application filed May 22, 1876.

*To all whom it may concern:*

Be it known that I, ROBERT ULRICH ETZENSBERGER, of London, England, have invented an Improvement in Apparatus for Making Infusions, which is fully illustrated by the accompanying drawings, forming part of this specification.

This invention has for its object the arrangement of apparatus for making infusions or extracts from one or more substances, in a whole or disintegrated condition, by the aid of heated liquids, the parts of the apparatus containing the substances to be infused not being subjected to the direct action of the fuel employed in heating the liquid used, whereby a better result is obtained than when the fire or heat therefrom is allowed to act directly upon the parts containing the liquid and the substance to be infused.

Similar letters of reference indicate like parts in all the figures.

Figure 1 is a vertical section on the middle line through the upper and lower vessels, and the parts intersected, showing their interior arrangement. Fig. 2 is a front elevation. Fig. 3 is a side elevation. Fig. 4 is a plan of a small apparatus arranged for domestic use, the making of coffee, and similar purposes.

My invention consists of a lower closed vessel, A, in which the liquid to be heated is placed; an upper vessel, B, constructed with a steam-jacket to regulate the temperature of its contents; an adjustable receiver, C, formed with a false bottom and top, and impervious sides, (the top or lid so fitted to the same as to be readily removed, and yet, when in position, withstanding any required pressure from within, by means of its bayonet or flange fastenings;) an upper flow-pipe, D', contained in the upper vessel B, to which the adjustable receiver C is attached at F, (by means of any simple device suitable to the purpose, such as a cone-joint,) in which, near the point of attachment, is placed a non-return valve, F'; a lower conical flow-pipe, D, which connects with D' by means of the cone-joints G and E, and is contained in the lower vessel A, to the lower part of which it is secured, and constructed with suitable openings at its lower extremity to permit the flow of the liquid in the lower vessel through its entire length, the cone-joint E, which is vertically perforated, as shown in Fig. 1, to permit the passage of steam from the lower vessel to the steam-jacket surrounding the upper vessel, being also attached to the conical flow-pipe D and to the top of the lower vessel A in such a manner that, by removing the screw-fastenings by which it is secured to the lower vessel, it may be removed with the lower conical flow-pipe, leaving a man-hole, through which the lower vessel may be cleaned and repaired.

H is a glass gage on the lower vessel, to indicate the height of the liquid therein, and J is a similar glass gage fitted to the upper vessel, and open at the top, for a similar purpose. Both or either may be made with index-plates, for greater convenience and exactness in working the apparatus. K is a safety and vacuum valve connected with the lower vessel or steam-generator A, by means of which the pressure and temperature of the liquid are regulated; L, a filling cock and funnel for charging the lower vessel, and M an exhaust-cock to adjust and regulate the temperature in the steam-jacket, and control the pressure on the liquid in the lower vessel.

For the better information of the public, I will proceed to describe the action of my apparatus when in use.

The substance to be infused is placed in the adjustable receiver C, and the lid is secured, as before described. The receiver is then attached to the upper flow-pipe D', and the upper vessel containing them is placed in position by adjusting the socket at the end of the upper flow-pipe D' to the cone-joint E, on the upper exterior of the lower closed vessel or generator A, and forming the upper extremity of the lower or conical flow-pipe D.

An air-space is allowed between the upper and lower vessels by interposing a perforated rim between them, and forming part of the rim of the upper vessel.

After the upper vessel is placed in position, the lower vessel or generator is supplied with the requisite amount of liquid by means of the filling-cock L, leaving space for the generation of steam, as shown by the gage H.

The lid is then placed in position over the upper vessel, the several cocks are shut off, and the apparatus is ready for the application of heat, the lower flow-pipe being in conjunction with the upper flow-pipe, and the steam-jacket of the upper vessel B having free communication with the steam-space in the generator or closed vessel A through the perforations in the rim of the cone-joint E.

When heat is applied the action is as follows: As the temperature rises above the boiling-point steam is formed and collects in the steam-space and steam-jacket until the pressure is sufficient to overcome the equilibrium existing between the liquid in the generator and the liquid in the lower flow pipe D, causing a change of level and forcing the liquid in the generator up the flow-pipes D and D' in a highly-heated state. When the liquid reaches the upper extremity of the flow-pipe D' and passes the non-return valve F', it enters the lower part of the adjustable receiver C, where, in attempting to force its way through the false bottom, it is obstructed by the substance to be infused, which is confined between the sieve-like bottom and top of the receiver. When the pressure has reached a higher point the superheated liquid is forced through the substance that has obstructed its passage upward, and flows out and over the perforated cap of the receiver, falling into the upper vessel B in a highly-charged condition—all the aroma being retained—whence it can be drawn by the cock placed for that purpose, (marked n in the figures,) or kept heated until wanted by the steam-jacket, before described.

This operation can be kept up as long as there remains any soluble component in the substance to be infused, or until the liquid in the lower vessel has been exhausted.

Where it is desired that the action shall be continuous, it is only necessary to adjust an injector to the lower closed vessel to supply it with liquid, and to replace the residue remaining in the receptacle, after infusion, with fresh substance, by removing the receptacle from the flow-pipe and refilling it, or by replacing it with a similar receptacle already filled, having previously opened the exhaust-cock M in the steam-jacket to reduce the pressure, and thereby preventing the rise of the liquid in the flow-pipes during the operation of readjustment or refilling, and before removing the lid of the upper vessel.

The receptacles may be made in sets of varying capacity to fit the same flow-pipe, thus allowing of greater scope in the use of the same apparatus.

The vessels are fitted with convenient handles P P P P, and the lower vessel is supplied with a draw-off cock, O.

Where it is desirable to dispense with the lower vessel the flow-pipe D' may be directly connected with the water-back or boiler of a kitchen-range, or any other source of supply, and the operation carried on in substantially the same manner.

The process of passing hot liquids through substances to be infused is not a novel one, and is not claimed; but

What is claimed as a new and useful improvement in apparatus for making infusions, and for which Letters Patent of the United States are desired, consists in—

1. The combination, in an apparatus for making infusions, of the adjustable receptacle C, with its impervious sides and false bottom and top, with the upper flow-pipe D', its non-return valve F', adjustable joints F and G, in connection with the lower flow-pipe D, by means of the perforated cone-joint E, substantially as set forth, and for the purpose specified.

2. In an apparatus for making infusions, the combination of the steam jacket, its exhaust-valve M, and perforated cone-joint E, with the steam-space of the lower vessel A, for the better regulating of the action of the apparatus and the equalization of temperature, as set forth in the foregoing specification.

In witness whereof I have hereunto signed my name to this specification in the presence of two subscribing witnesses.

R. U. ETZENSBERGER.

Witnesses:
A. KLEINMANN,
J. T. WEBSTER.